United States Patent [19]

Saito

[11] Patent Number: 4,753,903

[45] Date of Patent: Jun. 28, 1988

[54] SILICON CARBIDE SINTERED BODY AND A MANUFACTURING METHOD THEREFOR

[75] Inventor: Akira Saito, Kokubu, Japan

[73] Assignee: Kyocera Corporation, Kyoto, Japan

[21] Appl. No.: 846,896

[22] Filed: Mar. 27, 1986

[30] Foreign Application Priority Data

Mar. 30, 1985 [JP] Japan ................................. 60-67692

[51] Int. Cl.$^4$ ............................................. C04B 35/56
[52] U.S. Cl. ...................................... 501/88; 252/516; 501/89; 501/90; 501/91; 501/92
[58] Field of Search ....................... 501/89, 88, 90, 92, 501/91; 252/516

[56] References Cited

U.S. PATENT DOCUMENTS 4,336,215  6/1982  Yajima et al. ........................ 501/88
4,555,358  11/1985  Matsushita et al. .................. 501/89

FOREIGN PATENT DOCUMENTS 58-64279  4/1983  Japan ..................................... 501/92
60-155573  8/1985  Japan ..................................... 501/90

Primary Examiner—Steven Capella
Attorney, Agent, or Firm—Spensley Horn Jubas & Lubitz

[57] ABSTRACT

A silicon carbide sintered body suitable for electrical discharge machining and a method for its manufacture are disclosed. The silicon carbide sintered body comprises 0.5-5% by weight of AlN, 0.5-3% by weight (as Ti) of a Ti compound, 0.5-8% by weight of C, 0-3% by weight (as B) of B or a B compound, and a remainder of substantially SiC. It has a volume resistivity at room temperature of not greater than 10 ohm-cm and a density of at least 90% of the theoretical density of SiC. The manufacturing method comprises shaping a mixture of the raw materials and sintering the shaped green body in a non-oxidizing atmosphere at a temperature of 2000°-2300° C.

8 Claims, No Drawings

SILICON CARBIDE SINTERED BODY AND A MANUFACTURING METHOD THEREFOR

BACKGROUND OF THE INVENTION

1. Field of the Invention

This invention relates to a silicon carbide sintered body which is suitable for electrical discharge machining and which exhibits excellent high-temperature strength. It also relates to a method for manufacturing such a silicon carbide sintered body.

2. Description of the Prior Art

Silicon carbide sintered bodies have excellent oxidation resistance, corrosion resistance, heat resistance, thermal shock resistance, high-temperature strength, and other superior properties which make them highly suitable for use in parts for high-temperature gas turbines, parts for automotive engines, items requiring corrosion resistance, and the like.

Silicon carbide (SiC) has a relatively strong covalent bond, and therefore it is practically impossible to sinter silicon carbide powder alone. In order to obtain a strong, dense silicon carbide sintered body, use of various sintering or densification additives has been proposed in the prior art.

The most typical methods for manufacturing silicon carbide sintered bodies are the high-temperature pressurized sintering method (also known as the hot-pressing method) and the pressureless sintering method. In the latter method, one or more sintering additives such as a boron compound, an aluminum compound, and carbon or a carbonaceous substance are added to silicon carbide powder and the resulting mixture is shaped or molded into a green body and sintered in a non-oxidizing atmosphere at subatmospheric or atmospheric pressure.

Recently, much research has been performed with respect to sintering of SiC-Al, SiC-Al-C, SiC-B-C, and SiC-B-Al-C systems. Examples of patent publications which disclose sintering of these systems are U.S. Pat. No. 4,455,385 (disclosing pressureless sintering of an SiC-B-C system), U.S. Pat. No. 4,135,937 (hot-pressing of an SiC-AlB$_2$-C system), U.S. Pat. No. 4,354,991 and Japanese Patent Publication No. 60-34515 (both disclosing pressureless sintering of an SiC-Al$_2$O$_3$ system), and Japanese Patent Laid-Open Applications Nos. 55-3396 (pressureless sintering of an SiC-AlN-C system) and 56-155071 (pressureless sintering of an SiC-Al-B-C system). As a result of the technical advances in this field, it has become possible to obtain high-strength and high-density silicon carbide sintered bodies by the hot-pressing method and the pressureless sintering method. However, particularly with respect to SiC-Al-C, SiC-B-C, and SiC-B-Al-C systems, there is the problem that abnormal or excessive grain growth tends to occur during sintering, and this may cause a deterioration in strength.

Furthermore, all the sintered bodies of the above prior art systems have the common problem that the electrical conductivity thereof is low, making it impossible to process them by electrical discharge machining.

Dense sintered silicon carbide products are most frequently used as substitutes for metallic parts, and they are usually required to have high dimensional accuracy. Since sintered SiC is usually prepared by powder metallurgy technology, i.e., by molding of powders followed by sintering, it is difficult to manufacture an as-sintered body having a complicated shape. Therefore, in most cases, silicon carbide sintered bodies are subsequently subjected to machining in order to obtain products having the desired shape and dimensional accuracy. However, as is well known to those skilled in the art, sintered SiC is a highly hard and brittle material, and it is extremely difficult to apply precise and fine work to it by means of a conventional mechanical machining technique such as grinding or boring. For this reason, precision parts, such as injection nozzles in which fine holes must be formed could not be manufactured from a sintered SiC body. In contrast with conventional mechanical machining, electrical machining techniques such as electrical discharge machining and electrochemical machining are suitable for precise and fine work of a very hard material such as sintered SiC. Therefore, it is highly desirable that sintered SiC be electrically conductive to such a degree that electrical discharge machining can be applied thereto.

Japanese Patent Laid-Open Application No. 57-22173 discloses a silicon carbide ceramic of an SiC-Al$_2$O$_3$-TiO$_2$ system (containing 0.5–30% Al$_2$O$_3$ and 0.2–15% TiO$_2$) which can be subjected to electrical discharge machining. Japanese Patent Laid-Open Application No. 57-196770 discloses a sintered SiC product manufactured by electrical discharge machining in which one or more additives selected from carbides, nitrides, borides, oxides, or other compounds of Group IVa, Va and VIa elements (such as Ti, Ta, Hf, Zr, Mo, and W) and Al$_4$C$_3$ are incorporated. U.S. Pat. No. 4,327,186 discloses electrically-conductive sintered articles based on a binary composition of SiC-TiB$_2$, and more particularly made from an SiC-TiB$_2$-B-C system. However, these sintered products do not always exhibit satisfactory high-temperature strength, which is required for most uses of sintered SiC products.

Thus, there is still a need for a sintered body which has sufficient electrical conductivity to make it suitable for electrical discharge machining as well as improved high-temperature strength.

SUMMARY OF THE INVENTION

It is an object of the present invention to overcome the above-described drawbacks of conventional silicon carbide sintered bodies and to provide a silicon carbide sintered body which can be processed by electrical discharge machining and which exhibits high strength even at high temperatures.

It is another object of the present invention to provide a method for manufacturing such a silicon carbide sintered body in which abnormal grain growth which may cause a deterioration in strength does not take place during sintering.

In one aspect, the present invention provides an improved silicon carbide sintered body comprising 0.5–5% by weight of AlN, 0.5–3% by weight (as Ti) of a titanium compound, 0.5–8% by weight of carbon, and a remainder of substantially SiC, the sintered body having a volume resistivity at room temperature of not greater than 10 ohm-cm, and a density of at least 90% of the theoretical density of SiC. The sintered body may further comprise up to 3% by weight (as B) of elemental boron or a boron compound.

In another aspect, the present invention provides a method for manufacturing a silicon carbide sintered body, which comprises shaping a mixture comprising 0.5–5% by weight of AlN, 0.5–3% by weight (as Ti) of a titanium compound, 0.5–8% by weight of carbon, and a remainder of substantially SiC so as to form a shaped green body, and sintering the shaped body in a non-oxidizing atmosphere at a temperature of 2000°–2300° C. Preferably the sintering is effected under substantially pressureless conditions.

DETAILED DESCRIPTION OF THE INVENTION

A silicon carbide sintered body according to the present invention which is of an SiC-AlN-Ti-C or SiC-AlN-Ti-B-C system has excellent high-temperature strength. The reason for this is thought to be as follows.

It is well known that abnormal grain growth during sintering is more likely to occur in an SiC-B-Al-C system than in an SiC-B-C system. Although the reason for this phenomenon is not clear, it is thought that it is because a low-melting substance is formed when Al and B coexist.

In the composition of the present invention a Ti compound such as TiC is added to this type of Al-containing system in which abnormal grain growth can easily occur. In sintering of an SiC-AlN-Ti-B-C system, Al and B can diffuse in SiC thereby enabling the sintering to proceed adequately, but Ti can not diffuse in SiC. As a result, it is thought that Ti, which has a large atomic radius, exists along grain boundaries and suppresses undesirable excessive grain growth.

Therefore, due to the addition of Ti, abnormal grain growth does not take place during sintering, and the resulting sintered body is still entirely kept in the form of fine crystal grains with a diameter of at most 10 microns. As a result, the sintered body has a high density, and a high strength can be maintained.

Structurally, a sintered body according to the present invention largely comprises fine silicon carbide particles with a diameter of at most 10 microns among which are dispersed particles of a Ti compound such as TiC, TiN, or the like.

A sintered body according to the present invention has a low volume resistivity of not greater than 10 ohm-cm and is suitable for electrical discharge machining. The reason for this is that, as stated above, unlike Al and B, Ti is unable to diffuse in SiC and it can exist only along grain boundaries. Because it is dispersed uniformly and continuously along the SiC grain boundaries, it is thought that electricity is easily conducted along the grain boundaries through the Ti, resulting in good conductivity.

Next, the reasons for the limits on the components, the properties, and the sintering conditions of the present invention will be explained.

AlN (aluminum nitride): If AlN is present in an amount of less than 0.5% by weight, the resulting system is essentially the same as an SiC-B-C system to which a Ti compound has been added, in which case Ti acts as a sintering inhibitor, sintering does not proceed adequately, and a dense body can not be obtained. On the other hand, if the amount of AlN exceeds 5% by weight, the sintering is also inadequate due to the reactivity between Al and C. Preferably, the amount of AlN is in the range of 1–3% by weight.

Ti (titanium): If the amount of a Ti compound is less than 0.5% by weight as Ti, it is unable to suppress abnormal grain growth to a substantial extent, while if its amount is greater than 3% by weight as Ti, it inhibits densification and sintering is inadequate. Preferably a Ti compound is present in an amount of 1–2% by weight as Ti. Examples of a Ti compound useful in the present invention are titanium nitride (TiN), titanium carbide (TiC), titanium hydride ($TiH_2$), titanium diboride ($TiB_2$), titanium dioxide ($TiO_2$), and the like. Preferable Ti compounds are TiN, TiC, and $TiH_2$.

C (carbon): If C is present in an amount of less than 0.5% by weight, sintering does not proceed adequately, while if it exceeds 8% by weight, the amount of residual carbon in the resulting sintered structure increases, causing a decrease in density and strength. Preferably, the amount of C is in the range of 2–5% by weight.

As is well known by those skilled in the art, carbon may be added in the form of free particulate carbon, e.g., high-purity carbon black or graphite powder. Alternatively, any carbonizable organic substance may be used as the carbon source. Examples of such organic substances useful as the carbon source are phenolic resins such as phenol-formaldehyde resins, cresol-formaldehyde resins, furan-based resins, polyphenylene resins, tar, pitch, and the like, because these substances give high carbonization yields during sintering.

B (boron): B is not an essential component in the present invention, but optionally it may be added. However, the addition of B in the form of elemental boron or a boron compound is recommended because it improves sinterability. If added, it should be present in an amount of at most 3% by weight as B since if it exceeds this level, the effect of B on sintering becomes greater than the effect of Al on sintering, the inhibitory effect of Ti on sintering becomes significant, and a dense body can not be obtained. Preferably the amount of B or a boron compound is at most 1% by weight as B. Examples of a boron compound useful in the present invention are boron carbide ($B_4C$), boron nitride (BN), and zirconium boride ($ZrB_2$).

The remaining portion of the sintered body is comprised substantially of SiC. The SiC powder used in the present invention may be $\alpha$-SiC or $\beta$-SiC, which preferably has a purity of at least 95%, and more preferably at least 98%, and an average particle diameter of at most 1 micron, and more preferably at most 0.5 micron.

The powder each of AlN, a Ti compound, and B or a B compound (if present) preferably has an average particle diameter on the order of a micron or smaller.

Volume Resistivity: If the volume resistivity of the sintered body is greater than 10 ohm-cm, it becomes difficult to develop discharges, and the sintered body can not be processed by electrical discharge machining. Preferably, the volume resistivity is not greater than 1 ohm-cm.

Density: If the density (the relative density with respect to the theoretical density of SiC) is less than 90%, the sintered body can not exhibit high strength, particularly at high temperatures.

Sintering Atmosphere and Sintering Temperature: If the sintering temperature is less than 2000° C., sintering does not proceed adequately, while if the temperature exceeds 2300° C., breakdown of the shaped body by sublimation of SiC becomes severe during sintering, and a high-strength sintered body can not be obtained. Preferably the sintering is carried out at a temperature in the range of 2100°–2200° C. The sintering atmosphere should be non-oxidizing such as an argon, helium, or nitrogen atmosphere.

According to the method of the present invention, a mixture of the raw materials is first prepared and it is shaped in a conventional manner, such as by using a mold or a rubber press or by the slip casting method, to form a green body of the desired shape. In preparing the mixture, a solvent such as water or an organic solvent may be used as necessary. If a water-insoluble carbon source is used as a raw material, an organic solvent which dissolves the carbon source such as acetone, toluene, isopropyl alcohol, or the like is added. The green body is then fired in a non-oxidizing atmosphere at a temperature in the above range to yield a sintered body. The firing or sintering of the green body may be carried out under pressure, but preferably under substantially pressureless conditions.

Next, the present invention will be further explained by way of the following examples, which are given merely for the purpose of illustration and are not meant to be limiting in any way.

EXAMPLE 1

SiC powder ($\alpha$-SiC with an average particle diameter of 0.4 micron), AlN powder (average particle diameter: 1 micron), a titanium compound (average particle diameter: 1 micron), and B or a boron compound (average particle diameter: 0.8 micron) were blended in the proportions shown in Table 1 to obtain Samples Nos. 1-18.

Each of the samples was wet mixed with an ethanol solvent in a pot mill using urethane balls as grinding media. After mixing, the mixture was dried. A phenolic resin was added to the resulting mixed powder so as to obtain the proportions of carbon indicated in Table 1. Next, an acetone solvent was added, and after thorough mixing in a mortar, the acetone solvent was volatilized. The remaining mass was lightly crushed and then granulated using a pan granulator to obtain a raw material for shaping (molding).

Molding was performed using a mold press at a molding pressure of 1.5 T/cm². Sintering was performed at atmospheric pressure by firing the molded green body in an argon atmosphere at a rate of temperature increase of 20° C. per minute. After the temperatures listed in Table 1 were maintained for the indicated retention time, the sintered bodies were allowed to cool.

The density of the resulting sintered bodies was measured using the Archimedes method, and bending strength was evaluated using the JIS 4-point or 3-point bending method.

EXAMPLE 2

SiC powder ($\beta$-SiC with an average particle diameter of 0.3 micron), AlN powder (average particle diameter: 1 micron), a titanium compound (average particle diameter: 1 micron), and B or a boron compound (average particle diameter: 0.8 micron) were blended in the proportions shown in Table 1 to obtain Samples Nos. 19-21.

Each of the samples was wet mixed with an ethanol solvent in a pot mill using urethane balls as grinding media. After mixing, the mixture was dried. A phenolic resin was added to the resulting mixed powder so as to obtain the proportions of carbon indicated in Table 1. Next, an acetone solvent was added, and after thorough mixing in a mortar, the acetone solvent was volatilized. The remaining mass was lightly crushed and then granulated using a pan granulator to obtain a raw material for shaping (molding).

Molding and sintering were then performed in the same manner as in Example 1, and the density and the bending strength of each of the resulting sintered bodies were measured in the manner described above.

In Table 1, samples numbers with an asterisk indicate comparative runs wherein either the composition or sintering conditions were outside of the range of the present invention.

As can be seen from the test results for Samples Nos. 1-21 shown in Table 1, if the amount of AlN is outside the range defined by the present invention, sintering is inadequate and the relative density of the sintered body is considerably low, while if the amount of Ti is less than the prescribed range, abnormal grain growth takes place, the strength decreases, and the resistivity becomes extremely high.

Furthermore, if the amount of C is outside of the range of the present invention, the density of the sintered body is low and the strength is extremely poor.

If the sintering temperature is outside of the range of the present invention, the strength decreases and the resulting sintered body may be totally unusable.

On the other hand, a silicon carbide sintered body according to the present invention has a high density and good high-temperature strength combined with a low volume resistivity. Accordingly, whereas conventionally silicon carbide sintered bodies could generally be machined only by the extremely difficult processes of cutting and boring with a diamond, a sintered body according to the present invention can be machined by the much easier process of electrical discharge machining.

Although the present invention has been described with respect to preferred embodiments, it is to be understood that various modifications may be employed without departing from the concept of the invention which is defined by the following claims.

TABLE 1

| Sample No. | Composition (% by weight) | | | | | Sintering Conditions | | Properties of Sintered Body | | |
| | SiC | AlN | Ti Compound (% Ti) | B Compound (% B) | C | Temperature (°C.) | Retention Time (hr) | Relative Density (%) | 4-Point Bending Strength at 1400° C. (kg/mm²) | Volume Resistivity (ohm-cm) |
| --- | --- | --- | --- | --- | --- | --- | --- | --- | --- | --- |
| 1* | 97.4 | 0* | — 0* | B₄C 0.5 | 2 | 2200 | 1 | 95 | 43(Abnormal Grain Growth) | 6 × 10⁶ |
| 2* | 95.9 | 1.5 | — 0* | B₄C 0.5 | 2 | 2200 | 1 | 97 | 38(Abnormal Grain Growth) | 3.5 × 10⁴ |
| 3* | 94.6 | 0.3* | TiN 1.5 | B₄C 0.5 | 3 | 2140 | 1 | 84 | 25(Inadequate Sintering) | — |
| 4 | 93.9 | 0.5 | TiN 1.5 | B₄C 0.5 | 3 | 2140 | 1 | 91 | 56** | 7 |
| 4' | 93.1 | 3.0 | TiN 1.5 | — 0 | 2 | 2200 | 1 | 93 | 53 | 0.2 |
| 5 | 94.0 | 1.5 | TiN 1.5 | B₄C 0.5 | 2 | 2150 | 1 | 96 | 63 | 0.5 |
| 6 | 95.0 | 1.5 | TiC 1.5 | B₄C 0.5 | 2 | 2150 | 1 | 98 | 58 | 0.4 |
| 7 | 94.6 | 1.5 | TiH₂ 1.2 | B₄C 0.5 | 2 | 2150 | 1 | 94 | 61 | 0.03 |
| 8* | 92.5 | 3 | TiC 1.5 | B₄C 0.5 | 2 | 2100 | 1 | 92 | 64** | 10 |
| 9* | 89.5 | 6* | TiC 1.5 | B₄C 0.5 | 2 | 2100 | 1 | 87 | 19(Inadequate Sintering) | 10² |
| 10* | 95.5 | 1.5 | TiN 0.3* | B₄C 0.5 | 2 | 2100 | 1 | 93 | 35(Abnormal Grain Growth) | 10³ |
| 11 | 92.3 | 1.5 | TiC 3 | B₄C 0.5 | 2 | 2100 | 1 | 90 | 55** | 0.9 |
| 12* | 91.0 | 1.5 | TiC 4* | B₄C 0.5 | 2 | 2100 | 1 | 87 | 21(Inadequate Sintering) | — |
| 13 | 93.8 | 2 | TiN 1.5 | B₄C 0.2 | 2 | 2180 | 1 | 93 | 68 | 8 |
| 14* | 89.2 | 1.5 | TiN 1.5 | B₄C 5* | 2 | 2100 | 1 | 89 | 32 | — |

TABLE 1-continued

| Sample No. | Composition (% by weight) | | | | | Sintering Conditions | | Properties of Sintered Body | | Volume Resistivity (ohm-cm) |
| --- | --- | --- | --- | --- | --- | --- | --- | --- | --- | --- |
| | SiC | AlN | Ti Compound (% Ti) | B Compound (% B) | C | Tempera-ture (°C.) | Retention Time (hr) | Relative Density (%) | 4-Point Bending Strength at 1400° C. (kg/mm²) | |
| 15* | 96.1 | 1.5 | TiN 1.5 | B 0.3 | 0.2* | 2200 | 1 | 78 | 13 | — |
| 16* | 85.9 | 1.5 | TiN 1.5 | B₄C 0.5 | 10* | 2200 | 1 | 89 | 20 | — |
| 17* | 92.7 | 1.5 | TiC 2 | B₄C 1 | 2 | 1900* | 1 | 70 | 1 | — |
| 18* | 92.6 | 1.5 | TiN 2 | B₄C 1 | 2 | 2400* | 1 | Severe Sublimation Breakdown, No Form | | — |
| 19 | 91.9 | 2.0 | TiN 2 | BN 1 | 2 | 2180 | 1 | 95 | 54 | 0.3 |
| 20 | 93.8 | 1.5 | TiH₂ 1.5 | BN 0.5 | 2 | 2150 | 1 | 98 | 73 | 0.1 |
| 21 | 87.7 | 1.5 | TiC 1.5 | B 0.3 | 8 | 2180 | 1 | 92 | 65** | 10⁻² |

*Composition or sintering conditions were outside of the range of the present invention.
**Values of 3-point bending strength at 1400° C.

What is claimed is:

1. A silicon carbide sintered body consisting essentially of:
    0.5-5% by weight of AlN;
    0.5-3% by weight (as Ti) of a titanium compound;
    0.5-8% by weight of free carbon;
    0—3% by weight (as B) of at least one material selected from the group consisting of elemental boron and a boron compound; and
    a remainder of substantially SiC, said sintered body having a volume resistivity at room temperature of not greater than 10 ohm-cm and a density of at least 90% of the theoretical density of SiC.

2. A silicon carbide sintered body, consisting essentially of:
    1-3% by weight of AlN;
    1-2% by weight (as Ti) of a titanium compound;
    2-5% by weight of free carbon;
    0-1% by weight (as B) of at least one material selected from the group consisting of elemental boron and a boron compound; and
    a remainder of substantially SiC, said sintered body having a volume resistivity at room temperature of not greater than 10 ohm-cm and a density of at least 90% of the theoretical density of SiC.

3. The silicon carbide sintered body claimed in claim 1, wherein the volume resistivity is not greater than 1 ohm-cm.

4. The silicon carbide sintered body claimed in claim 2, wherein the volume resistivity is not greater than 1 ohm-cm.

5. A method for manufacturing a silicon carbide sintered body having a volume resistivity at room temperature of not greater than 10 ohm-cm and a density of at least 90% of the theoretical density of SiC, comprising the steps of:
    (a) shaping a mixture consisting essentially of
        0.5-5% by weight of AlN,
        0.5-3% by weight (as Ti) of a titanium compound,
        at least one material selected from the group consisting of free carbon and carbonizable organic substances in an amount sufficient to provide 0.5-8% by weight of free carbon after sintering,
        0.3% by weight of at least one material selected from the group consisting of elemental boron and a boron compound, and
        a remainder of substantially SiC, so as to form a shaped green body; and
    (b) sintering the shaped body in a non-oxidizing atmosphere at a temperature of 2000°-2300° C.

6. A method as claimed in claim 5, wherein said mixture consists essentially of:
    1-3% by weight of AlN,
    1-2% by weight (as Ti) of a titanium compound,
    at least one material selected from the group consisting of free carbon and carbonizable organic substances in an amount sufficient to provide 2-5% by weight of free carbon after sintering,
    0-1% by weight (as B) of at least one material selected from the group consisting of elemental boron and a boron compound, and
    a remainder of substantially SiC.

7. A method as claimed in claim 5, wherein said sintering is carried out under substantially pressureless conditions.

8. A method as claimed in claim 6, wherein said sintering is carried out under substantially pressureless conditions.

* * * * *